Oct. 21, 1952  E. W. GOMMEL  2,615,110
DIRIGIBLE AUTOMOTIVE ARC WELDER
Filed Nov. 25, 1950
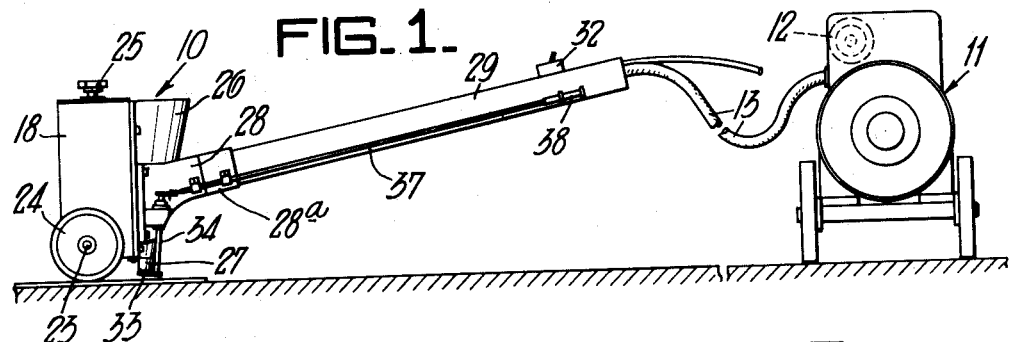
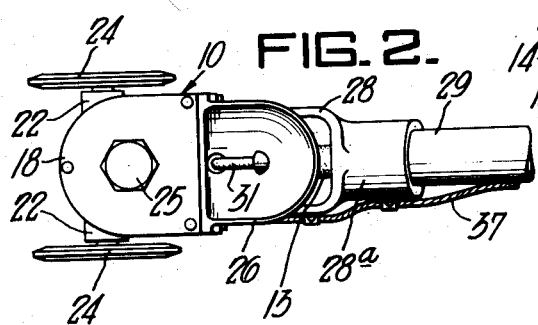
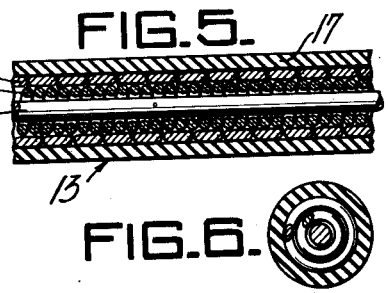
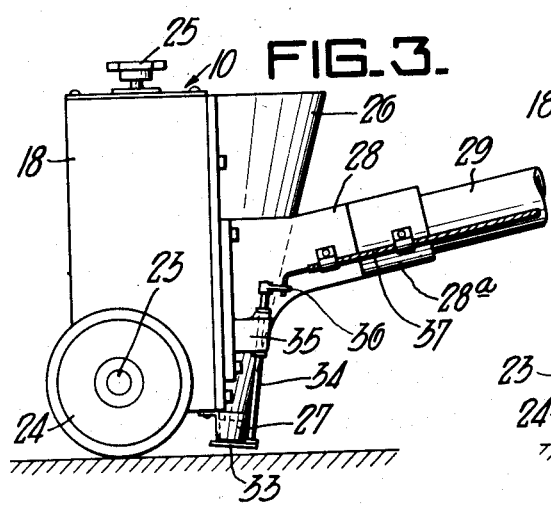
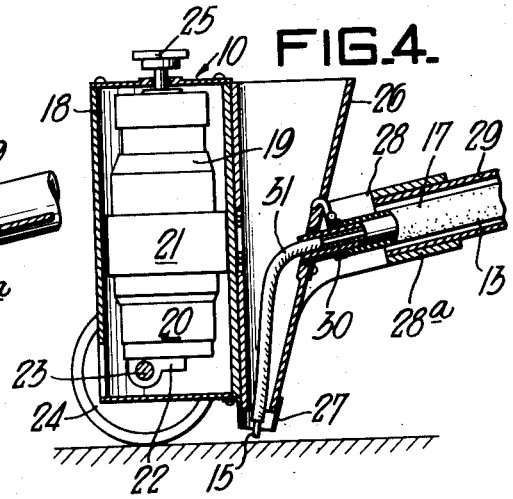
Inventor:
ERNEST W. GOMMEL,
Donald G. Dalton
his Attorney.

Patented Oct. 21, 1952

2,615,110

UNITED STATES PATENT OFFICE 2,615,110

DIRIGIBLE AUTOMOTIVE ARC WELDER

Ernest W. Gommel, El Cerrito, Calif., assignor to United States Steel Company, a corporation of New Jersey Application November 25, 1950, Serial No. 197,577

2 Claims. (Cl. 219—8)

This invention relates to an automotive arc welder adapted to travel over abutting workpieces under manual control and direction, having provision for laying down a blanket of flux to protect the seam between the workpieces as it is progressively welded. In particular, the invention relates to a wheeled, power-driven welding head having a steering and manipulating handle.

It is frequently desirable to weld seams between the abutting edges of plates laid on a table or on a shop floor. In order to permit the use of submerged-arc welding for such jobs, a portable welding head including a flux hopper has been employed in conjunction with a stationary automatic electrode-feeding unit connected to the head by an insulated hollow cable through which the wire electrode is fed. In using such a head, it is difficult to control and direct the movement thereof accurately as well as to maintain the desired arc gap between the work and the progressively fusing end of the wire electrode. I have invented a wheeled automotive welder having a manipulating handle facilitating manual control and direction thereof as well as maintenance of the proper arc gap, thereby overcoming the aforementioned objections.

In a preferred embodiment, I provide a motor housing with a pair of wheels journaled on a common axis, adapted to travel along the seam to be welded. A motor secured in the housing furnishes power to drive the wheels. A flux hopper secured to the housing delivers flux to the seam and contains a tube for guiding the intermittently fed electrode wire. A steering handle is secured to the housing or hopper, preferably at right angles to the wheel axis. The hopper is offset from this axis whereby tilting the handle causes the hopper and the electrode wire protruding therefrom to approach or recede from the workpieces. A closure at the discharge end of the hopper is operable from the end of the handle to control the delivery of the flux.

A complete understanding of the invention may be obtained from the following detailed description and explanation which refer to the accompanying drawings illustrating the present preferred embodiment. In the drawings, Figure 1 is a side elevation showing my automotive welder, a conventional electrode-feeding unit and a cable connecting them and affording a passage for the electrode wire;

Figure 2 is a plan view of the welder;

Figure 3 is a side elevation thereof to an enlarged scale showing it in welding position;

Figure 4 is a central vertical section through the welder; and

Figures 5 and 6 are longitudinal and transverse sections respectively, through the connecting cable.

Referring now in detail to the drawings and, for the present to Figures 1, 5 and 6, the automotive welder of my invention indicated generally at 10 is connected to an automatic electrode-feeding unit 11 provided with a reel 12 of electrode wire, by a cable 13. This cable is made up of a wire helix 14 defining a passage for the electrode wire 15 as it is fed from the reel 12 to the welder 10. The helix 14 is surrounded by conductor wires 16 laid helically thereabout. An insulated sheath 17 surrounds the wires 16 and helix 14. The electrode-feeding unit 11 operates, when the circuit between the free end of the electrode wire and the workpiece to be welded is completed, to feed the wire forward as it is fused and deposited in the weld.

The details of welder 10 are clearly shown in Figures 2 through 4. A vertically disposed tubular housing 18 has a motor 19 with a built-in gear reducer 20 disposed therein with its axis vertical and secured by a strap 21 encircling the motor. The housing has spaced bearings 22 in which a cross shaft 23 is journaled. This is the low-speed or output shaft of gear reducer 20. Wheels 24 are secured to the ends of shaft 23 projecting beyond the bearings 22. The motor 19 is preferably a variable-speed motor and is provided with a speed-control knob 25 secured to a shaft extending upwardly above the housing 18. The wheels 24 are of insulating material.

A flux hopper 26 is attached to the housing 18. The adjacent surfaces of the housing and hopper are plane and abut flatwise. The hopper is generally conical and is provided with a delivery spout 27 at the lower end. A bifurcated bracket 28 is secured to the housing and hopper and has a socket 28a adapted to receive one end of an elongated tubular handle 29. Cable 13 extends through the handle to a terminal fitting 30 therein of insulating material. A tube 31 of insulating material for guiding the electrode wire extends from the fitting 30 downward through the spout 27. The handle 29 has a switch 32 adjacent its outer end for controlling motor 19. A closure or gate 33 for spout 27 is mounted on a rod 34 journaled in a boss 35 on bracket 28. The rod 34 has a crank 36 on the upper end whereby it may be turned through a limited angle by a Bowden cable 37 extending along the handle 29 and terminating in a control knob 38 adjacent the outer end thereof.

When it is desired to use the welder to join a pair of plates, for example, it is placed over the abutting edges of the latter with the handle held at such an angle that the free end of electrode wire 15 protruding through spout 27 is spaced from the work. Assuming that the hopper 26 has been filled with powdered flux, that the generator supplying welding current through wires 16 is operating and gate 33 is closed, it is only necessary to operate switch 32 to start motor 19 and knob 38 to open the gate 33, and then lower handle 29 until the free end of the electrode wire comes in contact with the work. After initiating the arc, the handle is raised slightly to maintain the proper gap as the welder advances along the joint under its own power. Unit 11 operates in the known manner by feeding the electrode wire 15 forward as it is fused and deposited into the seam. The welder, of course, may be conveniently steered by handle 29 to insure that the end of the electrode wire follows along the seam. When the end of the weld is reached, it is only necessary to tilt the handle 29 upward, thus discontinuing the arc, and then restore switch 32 and knob 38 to stop the motor 19 and cut off the flow of flux from spout 27.

It will be apparent that the invention is characterized by numerous advantages. Of these, the most important is that the operator is saved a great deal of strain and fatigue which would be involved in supporting a welding head by hand and moving it along the desired line of weld while attempting to maintain the proper arc gap. The motor drive assures uniform speed of travel of the welder which is almost impossible in a manually supported welding head. The provision of a variable-speed motor makes it possible to weld at the speed best suited to the character of the workpieces. The device produces a much more uniform weld from the standpoint of metal deposited, weld penetration and maintenance of the desired line of weld than would be possible by manual handling of a portable welding head. Finally, the device is simple in construction yet highly effective in operation and permits a weld to be made much more quickly than by hand.

Although I have disclosed herein the preferred embodiment of my invention, I intend to cover as well any change or modification therein which may be made without departing from the spirit and scope of the invention. While reference has been made herein to the abutting workpieces, the invention is applicable to the welding of lap or other joints as well as butt joints.

I claim:

1. An automotive arc welder comprising a vertically upstanding tubular motor housing having a flat face on one side, a pair of spaced supporting wheels journaled on a common axis adjacent the lower end of said housing, adapted to travel on a workpiece, a motor in said housing driving said wheels, a hopper on said one side of said housing having a flat face in flatwise engagement with the flat face of the housing and a spout adapted to deposit welding flux on the workpiece along a line between said wheels, an electrode guide tube extending through said spout, and a manipulating handle having a bifurcated end embracing said hopper, said end being secured to said housing and extending generally normal to said axis whereby an electrode protruding from said tube may be caused to move toward or away from the workpiece by tilting said handle downwardly and upwardly, respectively.

2. An automotive arc welder as defined by claim 1 characterized by a closure for said spout, and manual control means for said closure extending along said handle.

ERNEST W. GOMMEL.

REFERENCES CITED

The following references are of record in the file of this patent:

UNITED STATES PATENTS

| Number | Name | Date |
|---|---|---|
| 1,953,915 | Burgett et al. | Apr. 3, 1934 |
| 2,357,376 | Baird | Sept. 5, 1944 |
| 2,423,190 | Kennedy | July 1, 1947 |
| 2,478,525 | Cutrer | Aug. 9, 1949 |
| 2,510,204 | Baird | June 6, 1950 |
| 2,536,294 | Landis et al. | Jan. 2, 1951 |

FOREIGN PATENTS

| Number | Country | Date |
|---|---|---|
| 519,256 | France | June 7, 1921 |
| 355,756 | Germany | July 3, 1922 |
| 367,360 | Germany | Jan. 20, 1923 |